PROCESSES EMPLOYING FLUENT SOLID PARTICLES

Original Filed April 29, 1950

Inventor
William W. Weinrich

By

F. W. Rose
Agent

United States Patent Office

Re. 24,538
Reissued Sept. 23, 1958

24,538

PROCESS AND APPARATUS EMPLOYING FLUENT SOLID PARTICLES

William W. Weinrich, Chevy Chase, Md., assignor to Houdry Process Corporation, Wilmington, Del., a corporation of Delaware Original No. 2,669,540, dated February 16, 1954, Serial No. 158,984, April 29, 1950. Application for reissue October 15, 1954, Serial No. 463,084

19 Claims. (Cl. 302—59)

Matter enclosed in heavy brackets [ ] appears in the original patent but forms no part of this reissue specification; matter printed in italics indicates the additions made by reissue.

The present invention relates to systems in which fluent solid particles or granules of contact material are continuously circulated through a downflow path and an upflow path, the contact material being contacted in at least one zone in the downflow path with a process gas and thereafter elevated, conveyed or transported through the upflow path for recirculation through the downflow path. Such systems are particularly adapted to the requirements of processes commonly employed in the chemical processing and oil refining industries. Two types of such systems are used in the latter industry and are characterized, among other differences, by the type of flow of solids through a process zone, being known as "fluid" or as moving bed processes. The granular contact material may be a porous or a fused solid and may comprise or consist of a catalyst or catalytically inert material, the latter being used for heat exchange, absorption or fractionation of gases.

The present invention involves the moving bed type of process in which relatively large particles or granules, such as sized particles, pellets, formed spheres and the like ranging in size from about 0.05 to 0.5 inch in diameter, flow principally or solely by the influence of gravity through a downflow path or paths of a system in which there are one or more process zones in such downflow paths. The gravitational flow of solids through such process zones is principally or solely as compact downwardly moving non-turbulent beds; a method which is discussed generally in "The 'T. C. C.' Catalytic Cracking Process for Motor Gasoline Production" by R. H. Newton, G. S. Dunham and T. P. Simpson, "Transactions of the American Institute of Chemical Engineers," volume 41, page 215, April 25, 1945, and in articles there cited.

In such a moving bed type of system, it has been found advantageous to transport the fluent solid particles (i. e., contact material) by one or more pneumatic or gas lifts in order to effect circulation of such particles through the downflow path or paths. The system may comprise a single downflow path in which there are several process zones at different heights, through which zones the contact material flows consecutively so that the solid particles need be transported by the gas lift only once in a complete cycle of operation or the system may comprise a plurality of gas lifts and/or downflow paths, which downflow paths may contain one or more process zones. An exemplary system of the first type has been described in an article entitled "Houdriflow: New Design in Catalytic Cracking," appearing in the "Oil and Gas Journal," page 78, January 13, 1949.

In such systems, the use of a gas lift, instead of the mechanical elevators formerly employed, produces many advantages both as to control of the processing variables or operating conditions and as to efficiency of operation (including cost and maintenance) but, at the same time, creates new problems. One problem associated with the operation of gas lifts of the type referred to above and in the operation of the system in general is that of smoothly transferring the particles from the upflow path to the downflow path without breaking or attriting the solid particles as by impact resulting from the downward fall of the particles after reversal of upward flow. The fact that, due to a constant small rate of attrition in the system in general, the total amount of catalyst in the system (commonly called the catalyst inventory) varies from time to time, further complicates the problem, as explained below. Because the features of constant flow and constant bed depth are obviously desirable, if not essential in the process zone or zones in the downflow path (such as the reactor and/or regenerator or kiln in a cracking system), it is undesirable to provide or permit any variation in catalyst inventory (which variation is commonly called the come and go in the system) in such process zones. Formerly, in mechanical elevator systems, the come and go was provided for in storage hoppers at the top of the downflow path but analogous use of the zone at the top of the upflow path in the gas lift type of system causes operational difficulties. The problem in such use of the zone at the top of the lift arises from its simultaneous use as a disengaging zone (i. e., a zone in which the solid particles elevated through the upflow path are separated or disengaged from the elevating gas). Because of the reversal in flow of the solid particles resulting from the disengagement of the elevating gas, these particles fall downwardly and collect at the bottom of the disengaging zone as a bed. When the come and go in the system is allocated to the disengaging zone, the vertical height of the surface of said bed of particles above the fixed bottom of the bed varies from time to time with a consequent variation in the distance which the particles fall after disengagement from the elevating gas. When the amount of particles in the bed is small the distance of fall of the particles is relatively great with resulting undesirable breakage of the particles. The present invention affords a solution to the problem outlined above.

In accordance with the present invention, particles disengaged from the elevating gas at the top of a gas lift of the type described herein are fed to the downflow path by continuously collecting the disengaged particles in a disengaging vessel, housing or zone after reversal of their upward movement as a body at a horizontal location, such as a horizontal baffle in said housing, near the upper end of the upflow path, said horizontal location being the bottom of the disengaging zone, continuously sliding at least one stream of particles from said body down an inclined open-topped path, such as a chute communicating with said baffle, continuously discharging particles from said inclined path to the surface of a bed of said particles, which bed is in a chamber in the lower portion of said housing, and continuously discharging particles from the bottom of said bed for flow through the downflow path. Under such conditions, the particles fall only a short constant distance after reversal of their upward direction and variation in a catalyst inventory is taken care of without affecting either the distance of fall of the particles or the operation of any process zone, since variation of the surface of the bed onto which the particles discharge can and does vary without affecting the distance of fall.

The invention is especially applicable to systems involving the conversion of petroleum, and for the purpose of illustrating the invention but not to be construed as a limitation thereon, it will be described hereinafter in connection with a catalytic cracking system for the conversion of high boiling hydrocarbons to motor gasoline.

Such a cracking system is set forth in detail below in connection with the description of the drawings in which.

Figure 1:
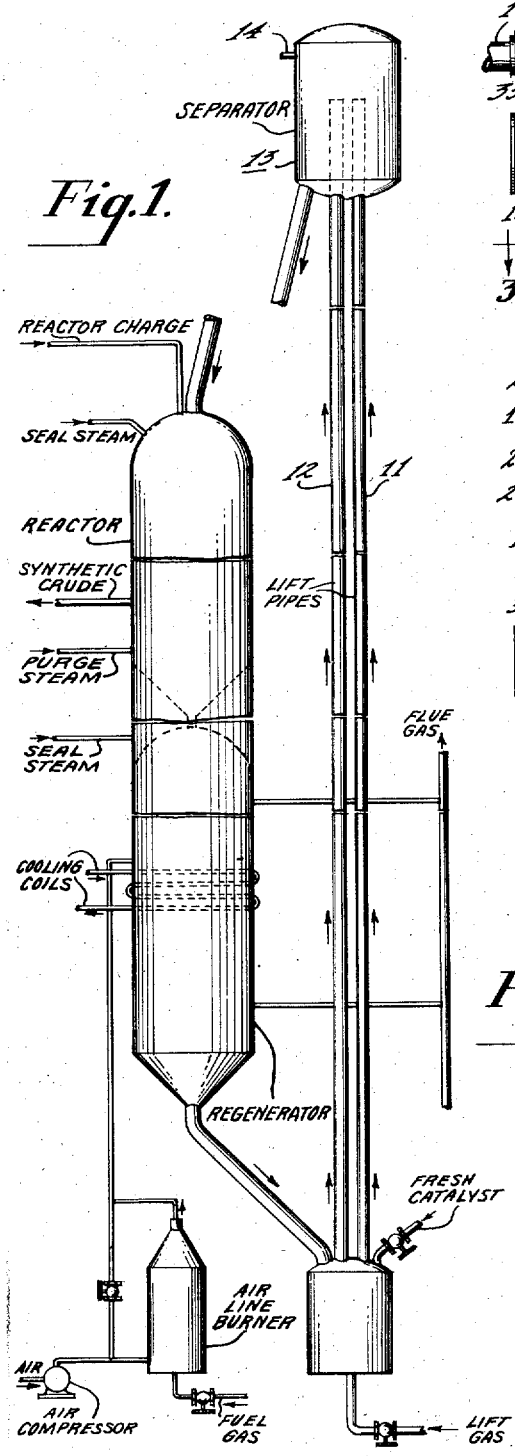
Figure 1 is a schematic generalized representation of a typical system in which the present invention may be used.

In Figure 1 is shown a typical embodiment of the type of system with which the present invention is concerned. Since the invention is directed primarily to the upflow portion of the system and since the operation and construction of the reactor and regenerator or kiln of the typical system shown in Figure 1 are adequately described in the aforementioned article appearing in the "Oil and Gas Journal," detailed illustration and description of the downflow portion have been omitted for the sake of brevity. It is to be understood that various arrangements of kiln and reactor may be employed in connection with the present invention, as for example arrangements shown in the "Houdry Pioneer," vol. 5, No. 1, February 1950. Figure 1 varies from the systems shown in the cited articles by having a multiplicity of gas lifts feeding a single downflow path. These multiple gas lifts are, however, constructed and operated in a similar manner to the single gas lifts shown in the article cited.

As indicated by the labelled parts in Figure 1, relatively large particles of solid cracking catalyst, such as particles of between about 1 to 15 and preferably about 2 to 8 millimeters in diameter, flow downwardly through a reactor or cracking zone as a downwardly moving compact non-turbulent bed and contact hydrocarbons with the resultant formation of cracked products (synthetic crude), and are transferred through a conduit or seal leg to a regenerator, kiln or regenerating zone in which the coke deposited on the particles of catalyst in the cracking zone is removed. Compositions effective as hydrocarbon cracking catalysts (typically natural or synthetic aluminosilicates) and the conditions in the reactor and kiln are well known to the art and need not be repeated here.

Catalyst particles are withdrawn from the regenerator and flow downwardly in a conduit or seal leg as a compact non-turbulent column to a gas lift inlet chamber, supply hopper or particle supply zone surrounding the bottom of a gas lift, and are transported, lifted or elevated vertically upward as a continuous stream of solid particles by a transporting, elevating or lifting gas introduced at a substantial pressure to the gas lift inlet chamber by a conduit as shown, the particles of contact material passing upwardly through elongated vertical cylindrical passageways or conduits 10, 11 and 12 to a closed housing, vessel, hopper or separator (indicated generally at 13), surrounding the common level of the tops of lifts which vessel 13 comprises a disengaging zone. The disengaged lifting gas is removed from vessel 13, as near the top thereof by conduit 14. If desirable, disengaged gases may then pass to a cyclone separator, in which entrained fine particles of catalyst are separated from the lifting gas.

Since the solid particles are subject to a gradual reduction in size during circulation through the system, the fine particles so formed are preferably continuously removed, as by an elutriator such as that disclosed in U. S. Patent No. 2,423,813, issued on July 8, 1947, to C. H. Lechthaler et al., in order to process particles flowing in the system so that such particles have a range of particle size such that a gas can be passed countercurrently through a downwardly moving compact mass of particles at a pressure drop in the range of about 4 to 8 inches of water per foot of mass depth. A fairly narrow range of particle size is preferably maintained in the system with the useful result that the flow of gas through compact beds of the particles is maintained at practical pressure drops, the gas lift is operable at low attrition rates, and an approximately constant static angle of repose of the particles (the angle with a horizontal plane assumed by the sides of a freely flowing pile of particles) is maintained. A particularly desirable size relationship within the size range referred to herein is such that the ratio of the average size of largest 5 percent of the total particles to the average size of the smallest 5 percent of the total particles is less than about 20 to 1 and preferably between 5 to 1 and 10 to 1, the angle of repose for such particles being between about 30° to 35°.

In a system, as described above, wherein fluent solid particles are elevated by gas through a gas lift or confined upflow path, which upflow path extends between zones or vessels located at different elevations and preferably in the same vertical line as shown in Figure 1, the zone at the top of the upflow path is necessarily at a lower gaseous pressure than the zone at the bottom thereof so that there is a gaseous pressure drop through the upflow path. This pressure drop may be considered as resulting principally from the expenditure of energy by lifting gas in supporting and elevating the particles; the magnitude of the pressure being directly related to the work expended in lifting the particles.

Control of the rate of addition of the lifting gas and of the particles to the upflow path provides a means of controlling the operation of the gas lift. In order to obtain desirably high rates of catalyst circulation, lifting gas is introduced into the lift in an amount and at a pressure such that its velocity is sufficient to accelerate the particles to a substantial velocity. Experience has shown that a particularly advantageous range of particle velocity is about 30 to 100 feet per second (as measured when the particles are substantially completely accelerated), although a lower velocity, such as down to about 10 feet per second, may be employed in relatively short lifts such as those of 50 feet or less. It has also been found desirable to taper the upper portion of a gas lift, such as the upper 5 to 40 percent, at a small angle, such as from about 0.15 to 3°, so as to slow down the particles prior to emergence from the gas lift to velocities in the range of about 5 to 40 feet per second.

Figure 2:
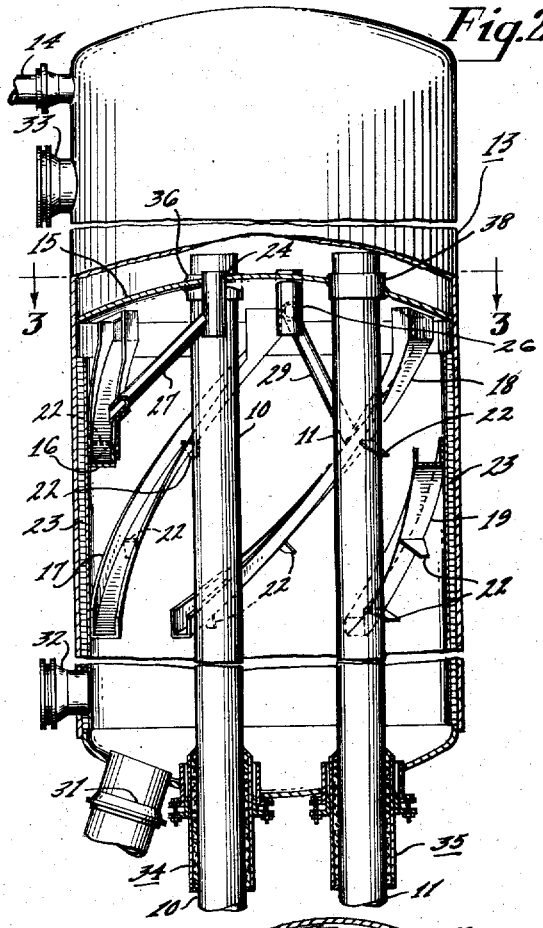
Figure 2 is an enlarged view of a preferred embodiment of a separator vessel or housing embodying the present invention with parts broken away to give a better view of the internal structure of the vessel.
Figure 3:
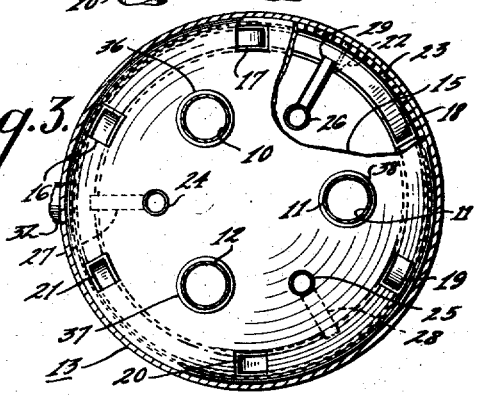
Figure 3 is a horizontal cross-sectional view of the vessel shown in Figure 2 taken along the lines 3—3, with a portion broken away to give a better view of parts located below.

In accordance with the present invention and as shown in detail in Figures 2 and 3, the vessel or housing 13 at the top of the group of gas lifts 10, 11 and 12 is of substantially greater horizontal area than the circle circumscribing the group of lifts and extends from above the upper ends of lifts 10, 11 and 12 (which lifts terminate in a common horizontal plane) to a considerable distance therebelow. Within vessel or housing 13 and positioned adjacent or near the upper ends of the gas lifts is a horizontal baffle or plate 15 which, with the upper portion of housing 13, comprises a chamber for disengaging particles from lifting gas. Baffle 15 may be curved as shown in Figure 2 or may be a level or sloping plane. Positioned below and extending downwardly from baffle 15 are a plurality of open-topped inclined troughs, chutes or race ways 16, 17, 18, 19, 20 and 21. Chutes 16, 17, 18, 19, 20 and 21 communicate individually at their upper ends with a plurality of apertures in baffle 15 which apertures are regularly spaced in respect to horizontal baffle 15, as, for example, in Figures 2 and 3, where these apertures are regularly spaced around the periphery of baffle 15. Chutes 16, 17, 18, 19, 20 and 21 are helically inclined at an angle greater than the angle of repose of the particles, as for example, at an angle in the range of about 30° to 70°, such as about 45°, and extend downwardly a substantial distance into the lower portion of housing 13. As shown in Figures 2 and 3, chutes 16, 17, 18, 19, 20 and 21 are supported by brackets 22 and are spaced away from the wall of the housing 13 by a grating 23 which grating extends substantially the full extent of the lower portion of the housing.

Also extending below baffle 15 are a plurality of conduits or pipes 24, 25, and 26 which communicate with a second plurality of apertures in baffle 15, the second set of apertures being regularly spaced in respect to the horizontal baffle and the first mentioned plurality of apertures with which chutes 16, 17, 18, 19, 20 and 21 communicate; the second plurality of apertures being shown in Figures 2 and 3 as relatively more centrally located than the first plurality of apertures. Conduits 24, 25 and 26 individually communicate with conduits 27, 28 and 29, the latter conduits being inclined and extending downwardly so as to discharge into chutes 16, 18 and 20, respectively. Conduits 24, 25 and 26 together with associated conduits 27, 28 and 29 constitute conduit systems containing confined streams of particles flowing from above baffle 15 into the chutes with which they are associated. Positioned below and in the bottom of housing 13 is a conduit 31 which comprises a means for discharging particles from the bottom of the lower portion of the housing 13 for flow through the downflow path. If desired, housing 13 may be provided with manholes for inspection such as manholes 32 and 33 shown in Figure 2.

Since housing 13 is generally rigidly supported at the top of the structure supporting the system, it is desirable to provide for expansion of lift pipes 10, 11 and 12 when the system changes from a cold state to a hot state. This may be conveniently done by providing insulated slip joints at the junction of the lift pipe and the bottom of housing 13 as indicated generally by joints 34 and 35 in Figure 2 and by providing loose collars 36, 37 and 38 in horizontal baffle 15 through which collars the lift pipes can freely move. The position of the top of the lift pipes 10, 11 and 12 in relation to baffle 15 when the apparatus is hot is as shown in Figure 2 (i. e., the tops of the lift pipes are adjacent the baffle with the baffle slightly below these tops).

In operation, particles discharge from the top of the lift pipes and thereafter generally spray upwardly and outwardly in fountain-like fashion above a lift pipe. At any event, the sudden reduction in velocity of the elevating gas by emergence into the disengaging chamber causes the lifting gas thereafter to exert little, if any, upward force on the particles; the particles accordingly travel upwardly until their velocity is spent and thereafter fall downwardly due to the influence of gravity.

In accordance with the present invention, the particles which fall downwardly under the influence of gravity after disengagement of the lift gas travel a relatively short distance downwardly and come to rest on baffle 15 which affords a horizontal location on which the falling particles collect as a body. The particles collected on baffle 15 thereafter discharge through the apertures therein and travel downwardly along inclined chutes 17, 18, 19, 20 and 21 or through conduits 24, 25 and 26 and associated conduits 27, 28 and 29. Because the chutes, and the downwardly inclined conduits 27, 28 and 29, are inclined at an angle greater than the angle of repose of the particles, the particles slide or roll freely down the smooth surfaces of the chutes and conduits in a manner and at a velocity which minimizes attrition and breakage of the particles. The streams of particles in the chutes continue to slide downwardly until the surface of the bed in the lower portion of housing 13 is reached and then discharge or spill out of the chutes onto the surface of the bed in the bottom of housing 13. Since the chutes are regularly distributed, the particles therefrom do not pile up in a single pile but are substantially regularly distributed over the surface of the bed. Should particles be removed from the bed, as through conduit 31, at a less rapid rate than the rate at which they are fed down the chutes, the surface of the bed will necessarily rise, the particles spilling over the sides of the chutes when the streams of particles therein encounter the surface of the bed at a level which progressively moves up the chutes at a slow rate. Should the rate of withdrawal be greater than the rate of addition, the particles merely slide further down the chutes until they encounter the slowly retreating surface of the bed. It is therefore clear that the particles do not fall through varying distances depending upon the level of the bed in the lower part of housing 13 but instead gently roll or slide down the chutes at rates considerably below the rates of free fall.

It is clear from the above description of the operation of the structure in housing 13 that the volume of the bed in the lower part thereof can vary without disturbing the operation of the system and without an adverse effect on the rate of attrition of the particles. Consequently the come and go (in the catalyst inventory) is conveniently and advantageously allocated to this bed with the result that the vertical heights of the surfaces of the bed above the bottom thereof varies from time to time, as for example, when fresh catalyst particles are added to the system as indicated in Fig. 1.

Although the invention has been described in connection with the plurality of associated gas lifts, it is applicable to systems in which a single gas lift is employed, in which event the apertures in baffle 15 are regularly arranged somewhat more centrally (i. e., on a circumference intermediate the gas lift and the periphery of the disengaging zone). When a single lift is employed the use of conduits 24, 25 and 26 together with associated conduits 27, 28 and 29 is optional, their use being preferred when the diameter of the disengaging zone is considerable, such as more than about 5 feet.

Obviously many modifications and variations of the invention as hereinbefore set forth may be made without departing from the spirit and scope thereof and therefore only such limitations should be imposed as are indicated in the following claims.

I claim as my invention:

1. In a process in which fluent solid particles continuously circulate through a system comprising a downflow path for said particles and a confined upflow path through which said particles are elevated by a gaseous medium and are thereafter discharged therefrom into a separator of substantially greater cross-sectional area than that of said upflow path comprising a disengaging zone in the upper region thereof above the discharge level of said upflow path and a storage zone in the lower region thereof below said discharge level adapted to contain a compact non-turbulent bed of disengaged particles, and of sufficient volume to provide a surge capacity for said system when the circulation of said particles is such as to cause a rise and fall of the surface level of said bed, the method of depositing disengaged particles from said disengaging zone onto the surface of said bed which comprises collecting said particles at at least one level within said disengaging zone while said particles are falling freely after reversal of their upward movement, and passing said collected particles downwardly along at least one inclined path to said storage zone, said inclined path being horizontally unconfined along at least that portion thereof extending into the region occupied by said rising and falling bed of particles, whereby, when the level of said bed rises above the lower end of said inclined path said particles spill over the sides of said inclined path onto the surface of said bed.

2. In a process in which fluent solid particles continuously circulate through a system comprising a downflow path for said particles and a confined upflow path through which said particles are elevated by a gaseous medium and are thereafter discharged therefrom into a separator of substantially greater cross-sectional area than that of said upflow path comprising a disengaging zone in the upper region thereof above the discharge level of said upflow path and a storage zone in the lower region thereof below said discharge level adapted to contain a compact non-turbulent bed of disengaged particles, and of sufficient volume to provide a surge capacity for said system when the circulation of said particles is such as to cause a rise and fall of the surface level of said bed, the method of transferring disengaged particles to the upper end of said downflow path which comprises the steps of collecting said particles at at least one level within said disengaging zone while said particles are falling freely after reversal of their upward movement, passing said collected particles downwardly along at least one inclined path to a level in the lower region of said storage zone, said inclined path being horizontally unconfined along at least that portion thereof extending into the region occupied by said rising and falling bed of particles, whereby, whein the level of said bed rises above the lower end of said inclined path said particles spill over the sides of said inclined path onto the surface of said bed, and passing said particles from the bottom of said bed to said downflow path.

3. The method defined in claim 1 in which said collected particles are passed downwardly into said storage zone along a plurality of said inclined paths extending a substantial distance into the region occupied by said rising and falling bed and terminating at a common level therein, said inclined paths being arranged to distribute said particles substantially uniformly over the surface of said bed.

4. The method as defined in claim 3 in which said unconfined inclined paths are arranged on helices of uniform radius about the axis of said separator, and including at least one inclined confined path for collecting particles from a location radially inwardly from said helices and for passing said particles into one of said unconfined paths adjacent its upper end.

5. The method of claim 4 characterized in that said particles comprise hydrocarbon conversion catalyst and in that said system comprises a conversion zone in which hydrocarbons are catalytically converted.

6. In a pneumatic lift for elevating granular material including an elongated lift pipe and a disengager housing surrounding a substantial upper end portion of said lift pipe, the space within said housing above the end of said lift pipe comprising a zone for disengaging the granular material from the lift gas by complete gravitational deceleration and free fall, and the space below the end of said lift pipe comprising a storage zone adapted to contain a compact bed of disengaged granular material, the combination of a transverse baffle extending across said housing at a level below and adjacent to the end of said lift pipe and adapted to intercept the freely falling granular material, said baffle having a plurality of openings for discharging said granular material, at least one inclined open chute having its upper end communicating with one of said openings and its lower end located at an intermediate level within said storage zone, and means in the lower portion of said housing and below the lower end of said chute for withdrawing granular material from said bed.

7. Apparatus as defined in claim 6 in which said openings are uniformly distributed over the surface of said baffle, and in which some of said openings are provided with said chutes.

8. Apparatus as defined in claim 7 in which said chutes are in the form of partial helices about the axis of said housing.

9. Apparatus as defined in claim 8 in which said chutes are located entirely within the peripheral region of said housing.

10. Apparatus as defined in claim 7 including tubular conduits communicating at their upper ends with the remainder of said openings, and at their lower ends with adjacent open chutes, said conduits being arranged to discharge granular material into the upper portion of said chutes.

11. Apparatus as defined in claim 10 in which the openings communicating with said chutes are located in the peripheral area of said baffle, and the openings communicating with said tubular conduits are located in the central area of said baffle.

*12. An improved method for lifting granular solid material through an upwardly extending lift passage by a lift gas to an elevated receiving zone containing a surge bed of such granular material, which method comprises, supplying solid material continuously to the lower end of said lift passage, supplying a lifting gas to the lower end of said lift passage to suspend and lift granular material upwardly through the passage, discharging substantially all of the suspended material upwardly from the upper end of the lift passage into a receiving zone of substantially greater horizontal cross-sectional area than said lift passage, whereby the upward velocity of the contact material is rapidly decreased to the point where the contact material falls downwardly within said receiving zone, transferring the gas, after separation from the solid material, upwardly in said receiving zone and withdrawing the gas from the receiving zone, collecting the granular material on the surface of the surge bed of solid material a substantial distance below the upper end of the passage, and retarding the downward movement of at least the major portion of the granular material prior to contact with the bed.*

*13. An improved method for lifting granular solid material which comprises: gravitating a substantially compacted column of granular material into a feeding zone, introducing a lift gas into the feeding zone to effect suspension of the granular material, transferring the material in suspension upwardly through a laterally confined lift passage, discharging the suspended material from the upper end of the lift passage into a receiving zone of substantially greater horizontal cross-sectional area than said passage, whereby the contact material upward velocity is rapidly decreased to the point where the contact material falls downwardly within said receiving zone, withdrawing the lift gas from the receiving zone, collecting the descending granular material on the surface of a gravitating bed of granular material near the top of the lift passage, maintaining a solids surge bed within said receiving zone below the top of the lift passage and below said gravitating bed and passing solid material downwardly from the gravitating bed to said surge bed.*

*14. A separator for a cyclic conversion system, comprising in combination: an upright vessel, an upwardly extending lift pipe projected through the bottom of the vessel, and terminated a substantial distance above said bottom, conduit means for gas withdrawal located in the upper portion of the vessel, conduit means for contact material withdrawal located in the lower portion of said vessel, means for catching contact material located a substantial distance above the bottom of said vessel, and means for gently lowering said contact material to a surge bed in the lower portion of said vessel, whereby breakage of the contact material in the separator is substantially reduced.*

*15. The method of separating a lift gas and granular contact material in a gas lift which comprises: discharging granular contact material suspended in a carrier gas from the upper end of an upwardly extending lift passage, at a level intermediate the top and bottom of an enlarged separating zone, whereby the upward velocity of the contact material is reduced and the particles commence to fall in said zone, collecting the contact material on a body of the solids maintained in said zone at a level a substantial distance above the bottom thereof, transferring the contact material downwardly in retarded flow as at least one stream to the surface of a surge bed at a discharge level in the lower portion of said zone.*

*withdrawing carrier gas from the upper portion of said zone and granular contact material from the lower portion of said zone whereby the contact material is separated from the carrier gas with minimum attrition.*

*16. An improved method for pneumatic transfer of a granular contact material from one level to a second level which comprises: maintaining a surge bed of said contact material at said higher level, mixing contact material at the lower level with a suitable lift gas to effect its suspension therein and passing the mixed material and gas upwardly from the first level as a confined lift stream, suddenly expanding said stream laterally at a level above said bed of contact material, whereby the stream upward velocity is rapidly decelerated and the contact material begins to fall downwardly toward said bed of contact material, transferring the gas, after separation, upwardly and imposing a positive hindrance to the fall of most of the contact material whereby the contact material is deposited onto said bed with a force substantially less than it would if permitted to fall freely.*

*17. In a process wherein a granular contact material is transferred from a zone at one level to a zone at a second and higher level by passing the contact material, suspended in a suitable carrier gas, upwardly from said first zone as a confined stream, the improvement which comprises: discharging substantially all of said confined stream through an unobstructed path upwardly into a confined separation zone of substantially greater horizontal cross-sectional area than said confined stream, whereby the stream is expanded laterally and the upward velocity of the contact material is rapidly decreased until the contact material begins to fall in said separation zone, permitting said contact material to drop down and to be deposited onto the surface of a surge bed in the lower section of said separation zone, while substantially impeding the drop of the granules so that they are deposited onto said surface with a force substantially less than would result from free fall, passing the carrier gas, after separation from said contact material, upwardly in said separation zone and withdrawing the carrier gas from the upper section of said separation zone and separately withdrawing the settled contact material from the lower section of said separation zone.*

*18. An improved method for pneumatic transfer of a granular contact material from one level to a second higher level which comprises, maintaining a surge bed of said contact material at said higher level, mixing contact material at the lower level with a suitable lift gas to effect its suspension therein and passing the mixed material and gas upwardly from the lower level as a confined lift stream passing through said surge bed, suddenly expanding said stream laterally at a level above said bed whereby the stream upward velocity is rapidly decelerated and the contact material begins to fall downwardly toward said bed, transferring the gas, after separation, upwardly and imposing a positive hindrance to the fall of the contact material in the vertical distance between said bed and the level at which the contact material begins to fall, whereby the contact material is deposited onto said bed with a force substantially less than it would if permitted to fall freely.*

*19. An improved method for pneumatic transfer of a granular contact material from one level to a second higher level which comprises, maintaining a surge bed of said contact material at said higher level, mixing the contact material to be transported with a lift gas at the lower level to effect its suspension therein, passing the contact material suspended in said lift gas upwardly as a laterally confined stream through said surge bed to a discharge level within a confined settling zone, which level is at a substantial distance above the surface of said bed, discharging substantially all of said stream upwardly into said settling zone, permitting the stream to laterally expand in said settling zone whereby its upward velocity is greatly decreased and the contact material begins to settle, catching the falling granules on a surface only a short distance below said discharge level and then causing at least most of the contact material to gravitate downwardly in retarded flow as at least one stream substantially the entire distance down to the surface of said bed, whereby the contact material is delivered onto said bed with a force substantially less than would be the case if it were permitted to fall freely from said discharge level onto said bed.*

References Cited in the file of this patent or the original patent

UNITED STATES PATENTS

| | | |
|---|---|---|
| 1,186,510 | Eldredge | June 6, 1916 |
| 1,302,531 | Dilley | May 6, 1919 |
| 1,795,986 | Adams | Mar. 10, 1931 |
| 2,114,728 | Toohey | Apr. 19, 1938 |
| 2,393,893 | Evans et al. | Jan. 29, 1946 |
| 2,407,700 | Huff | Sept. 17, 1946 |
| 2,414,373 | Gerhold | Jan. 14, 1947 |
| 2,429,359 | Kassel | Oct. 21, 1947 |
| 2,477,281 | Bergstrom | July 26, 1949 |
| 2,546,625 | Bergstrom | Mar. 27, 1951 |
| 2,561,771 | Ardern | July 24, 1951 |
| 2,579,834 | Kollgaard | Dec. 25, 1951 |
| 2,628,188 | Kirkbride | Feb. 10, 1953 |
| 2,676,142 | Crowley | Apr. 20, 1954 |
| 2,694,605 | Berg | Nov. 16, 1954 |
| 2,708,604 | Berg | May 17, 1955 |

FOREIGN PATENTS

| | | |
|---|---|---|
| 278,858 | Germany | Oct. 6, 1914 |
| 735,679 | Germany | May 21, 1943 |